United States Patent
Pfeiff

(10) Patent No.: US 11,362,397 B2
(45) Date of Patent: Jun. 14, 2022

(54) ENERGY STORAGE DEVICE, MOTOR VEHICLE, AND HOUSING COVER ASSEMBLY

(71) Applicant: AUDI AG, Ingolstadt (DE)

(72) Inventor: Markus Pfeiff, Koesching (DE)

(73) Assignee: AUDI AG, Ingolstadt (DE)

( * ) Notice: Subject to any disclaimer, the term of this patent is extended or adjusted under 35 U.S.C. 154(b) by 190 days.

(21) Appl. No.: 16/878,934

(22) Filed: May 20, 2020

(65) Prior Publication Data
US 2020/0373525 A1 Nov. 26, 2020

(30) Foreign Application Priority Data

May 20, 2019 (DE) .......................... 102019207347.6

(51) Int. Cl.
| | |
|---|---|
| *H01M 50/367* | (2021.01) |
| *H01M 50/20* | (2021.01) |
| *H01M 50/317* | (2021.01) |
| *H01M 50/249* | (2021.01) |
| *H01M 50/209* | (2021.01) |
| *H01M 10/658* | (2014.01) |
| *H01M 50/276* | (2021.01) |
| *H01M 50/383* | (2021.01) |

(52) U.S. Cl.
CPC ....... *H01M 50/367* (2021.01); *H01M 10/658* (2015.04); *H01M 50/20* (2021.01); *H01M 50/209* (2021.01); *H01M 50/249* (2021.01); *H01M 50/276* (2021.01); *H01M 50/317* (2021.01); *H01M 50/383* (2021.01)

(58) Field of Classification Search
None
See application file for complete search history.

(56) References Cited

U.S. PATENT DOCUMENTS

| | | | |
|---|---|---|---|
| 2012/0164490 A1* | 6/2012 | Itoi | H01M 10/6566 429/7 |
| 2013/0149583 A1* | 6/2013 | Kurita | H01M 10/6566 429/120 |
| 2014/0322566 A1 | 10/2014 | Kim | |
| 2015/0280189 A1 | 10/2015 | Ohshiba et al. | |

FOREIGN PATENT DOCUMENTS

| | | |
|---|---|---|
| DE | 4033909 C1 | 7/1992 |
| DE | 102016103411 A1 | 8/2017 |
| JP | 2011129372 A * | 6/2011 |
| JP | 2014-135247 A | 7/2014 |

OTHER PUBLICATIONS

Examination Report dated Apr. 28, 2020 in corresponding German application No. 10 2019 207 347.6; 20 pages.

* cited by examiner

*Primary Examiner* — Gregg Cantelmo
(74) *Attorney, Agent, or Firm* — Maier & Maier, PLLC

(57) ABSTRACT

An energy storage device for a motor vehicle, wherein the energy storage device has a battery module with a battery cell, which has an opening on the upper side thereof, it being possible to release said opening when there is overpressure, and a battery housing, wherein the battery module is arranged with its lower side facing a housing base, wherein the battery housing has a housing cover made of a first material, which can be arranged on a housing lower part of the battery housing, and which has an inner side, which is facing the at least one battery module when the housing cover is in the state in which it is arranged on the housing lower part.

15 Claims, 2 Drawing Sheets

ENERGY STORAGE DEVICE, MOTOR VEHICLE, AND HOUSING COVER ASSEMBLY

FIELD

The disclosure relates to an energy storage device for a motor vehicle, wherein the energy storage device has at least one battery module with at least one battery cell, wherein the battery module has a lower side and upper side opposite the lower side, and wherein the at least one battery cell has an opening on the upper side of the battery module, it being possible to release said opening when there is overpressure in the battery cell. Furthermore, the energy storage device has a battery housing with a housing lower part, which comprises a housing base, wherein the at least one battery module is arranged in the battery housing with its lower side facing the housing base, wherein the battery housing has a housing cover made of a first material, wherein the housing cover of the upper side of the at least one battery module can be arranged facing the housing lower part, and wherein the housing cover has an inner side, which is facing the at least one battery module in a state of the housing cover in which it is situated on the housing lower part. The invention also encompasses a motor vehicle having such an energy storage device as well as a housing cover assembly having such a housing cover for a battery housing of such an energy storage device.

BACKGROUND

Batteries for motor vehicles known from the prior art, particularly high-voltage batteries, may have several battery modules which may comprise, in turn, several individual battery cells. Such individual battery cells, particularly prismatic cells, may furthermore have an opening in this case, for example in the form of a pressure relief valve, it being possible to release said opening when there is overpressure occurring in the battery cell. Such a pressure relief valve is intended to provide a pressure equalization option specifically in the event of a malfunction, for example when a critical temperature of the battery cell is exceeded and gas development results in the cell, in order to prevent the battery cells from exploding. Such a malfunction may specifically then result correspondingly in the escaping of burning gases and particles from the battery cell through this pressure relief valve.

Furthermore, such battery cells and/or the battery modules comprising such battery cells are arranged in a battery housing which is closed by a corresponding housing cover on the upper side. With the previously described outgassing of the battery cells in the event of a malfunction, the burning gases and the particles escaping from the pressure relief valve may correspondingly impact such a battery cover and cause it to ignite or split open, and subsequently the gases and particles will reach neighboring vehicle parts. Because high-voltage batteries for motor vehicles are very large and thus accordingly require large housing covers, these covers are preferably weight-reducing to the extent possible, for example made of aluminum and correspondingly thin. In order to reliably prevent or at least delay the previously described splitting open of such a battery cover due to the escape of burning gases and particles from outgassing battery cells, such housing covers could be made of materials that are more robust and resistant, which, however, would entail the great disadvantage of a significantly higher weight.

DE 10 2016 103 411 A1 describes a battery device with a plurality of battery modules each having at least one battery cell and having one holding device for holding the battery modules. In this case, the holding device comprises a multilayered composite panel arranged underneath the battery modules, said composite panel being provided by means of several component layers connected to one another. The composite panel is suitable and designed for connection of the battery modules and comprises a flow path for a cooling medium and provides a protective base wall for protecting the battery modules when the vehicle is driven over obstacles.

SUMMARY

The object of the present invention is to provide an energy storage device for a motor vehicle, a motor vehicle, and a housing cover assembly which enable more protection during outgassing of battery cells and, in doing so, simultaneously keep the weight of the energy storage device as low as possible.

An energy storage device according to the invention for a motor vehicle has at least one battery module with at least one battery cell, wherein the battery module has a lower side and an upper side opposite the lower side, wherein the at least one battery cell has an opening on the upper side of the battery module, it being possible to release said opening when there is overpressure in the battery cell. Furthermore, the energy storage device has a battery housing with a housing lower part, which comprises a housing base, wherein the at least one battery module is arranged in the battery housing with its lower side facing the housing base, wherein the battery housing has a housing cover made of a first material, wherein the housing cover of the upper side of the at least one battery module can be arranged facing the housing lower part, and wherein the housing cover has an inner side, which is facing the at least one battery module in a state of the housing cover in which it is situated on the housing lower part. Furthermore, at least one heat-protection insert made of a second material, which is different from the first material, is arranged on the inner side of the housing cover in at least one predetermined first area, which is arranged at least over the releasable opening of the battery cell, when the housing cover is in the state where it is placed on the housing lower part.

The robustness of the housing cover can be significantly increased by providing such a heat-protection insert without having to unduly increase the total weight of the housing cover while doing so. This heat-protection insert can be specifically arranged in the area, namely the first area, which is above the releasable opening of the at least one battery cell when the housing cover is arranged properly on the housing lower part. The additional provision of such a heat-protection insert to the existing wall provided by the housing cover will also significantly increase the heat resistance and robustness to outgassing particles in the event of a malfunction specifically in the first area of the inner side of the housing cover, regardless of which material is used to produce said heat-protection insert. By virtue of the fact that the heat-protection insert is additionally produced from a material that is different than that for the housing cover, a significantly improved design of said heat-protection insert is advantageously enabled with respect to robustness and heat resistance, as compared to the housing cover. In this manner, burning through the housing cover can be efficiently avoided or at least delayed. Due to this local arrangement of the heat-protection insert in the aforementioned predetermined first area, which covers the releasable opening of the at least one battery cell, a significant weight reduction can additionally be achieved as compared to, for example, a total-surface sandwich construction of the entire housing cover or a total-surface design of the housing cover from a more robust material; or vice-versa, a design with significantly thicker walls in this first area is achieved by means of the provision, which is only local in this case, of the heat-protection insert, and thus significantly more robustness and heat resistance is provided in this first area.

The releasable opening in the at least one battery cell in this case can be designed by means of a pressure relief valve, as previously described. Furthermore, the at least one battery cell is preferably a prismatic battery cell. In addition, the energy storage device is preferably designed as a high-voltage battery, which may also have several battery modules, which, in turn, may comprise several individual battery cells, which are designed here as battery cells, such as lithium-ion cells for example.

Furthermore, the terms "upper" and "lower" and/or "upper side" and "lower side" relate to the proper installation position of the energy storage device in the motor vehicle. The provision of the releasable opening of the at least one battery cell on the upper side thereof or the upper side of the battery module has the advantage, for example, that greatly heated gases rise and thus can more easily escape to the releasable opening arranged on the upper side during outgassing of the battery cell, in the event of a malfunction. In a corresponding manner, such escaping gases and particles, which are greatly heated or even burning, then also directly impact the heat-protection insert positioned thereover.

With one advantageous embodiment of the invention, the second material is more heat-resistant than the first material, in particular, wherein the first material is aluminum or at least comprises aluminum for the large part, and the second material is or comprises iron, particularly steel, preferably even hardened steel, or a ceramic material. Specifically, ceramic materials or even steel, particularly hardened steel, are especially heat-resistant, fire-resistant, and additionally also resistant to abrasive gases. Other metals, particularly hardened metals and/or carbides, would also be conceivable. In this manner, the housing cover can be designed as especially resistant to outgassing of battery cells locally in the first area due to the heat-protection insert therein, while the remainder of the housing cover, which is preferably made of aluminum or an aluminum alloy, can be designed especially lightweight.

With a further advantageous embodiment of the invention, the at least one battery module has a cell pack with several battery cells, which are arranged next to one another in a longitudinal extension direction, comprising the at least one battery cell, wherein each of the several battery cells has a releasable opening on the upper side of the battery module, wherein the releasable openings of the battery cells are arranged along a second area extending in the longitudinal extension direction, and wherein the heat-protection insert is designed and arranged on the inner side of the housing cover to the extent that it is situated above the second area and covers the entire second area when the housing cover is in the state in which it is arranged on the housing lower part. In other words, thus a common heat-protection insert, which may be formed, for example, as a single piece, can be provided for several battery cells. The production of such an insert is thereby designed especially simply and efficiently. In the simplest case, such a heat-protection insert may be formed, for example, as a metal strip or ceramic strip extending in the longitudinal extension direction, which extends entirely over all the releasable openings of the respective battery cells.

With a further advantageous embodiment of the invention, the energy storage device has several battery modules arranged in a same row in the longitudinal extension direction, wherein the releasable openings of the respective battery cells of the battery modules arranged in the same row are all arranged along the second area, which extends in the longitudinal extension direction. In other words, one single heat-protection insert, which is formed as a single piece or even produced from multiple parts but contiguous, may be provided for all battery cells of several battery modules arranged in a same row. In other words, such a heat-protection insert may extend, for example, over several battery modules in the longitudinal extension direction to the extent that said heat-protection insert covers the respective releasable openings of the relevant battery cells. The same thing applies, in a corresponding manner as well, when the energy storage device has several rows, for example, where each row has several battery modules arranged in said rows, said battery modules extending in the longitudinal extension direction. Such a heat-protection insert, which likewise extends in the relevant longitudinal extension direction, can then be provided for a respective row. In other words, several heat-protection inserts may also be provided in this case on the inner side of the housing cover, for example extending parallel to one another, particularly extending in the longitudinal extension direction. Thus, heat and abrasion protection can be very specifically provided where it is required in the event of a malfunction, in a simple and efficient manner, which can also be efficiently implemented for a high-voltage energy storage device with numerous battery modules, which may, in turn, comprise numerous individual battery cells.

With an especially advantageous embodiment of the invention, the heat-protection insert has two angled flanks, which extend away from the housing cover and away from one another as the distance increases in a certain direction, particularly perpendicular to the previously defined longitudinal extension direction, from a middle area of the heat-protection insert, particularly wherein the certain direction extends in the direction of a width of the at least one battery cell when the housing cover is in the state in which it is arranged on the housing lower part, wherein the width of the at least one battery cell extends perpendicular to its height, which extends, in turn, in the direction from the upper side to the lower side of the battery module. In particular, the height and the width of such a prismatic battery cell extends, in turn, perpendicular to its thickness, which then extends according to the previously defined longitudinal extension direction. The thickness of such a battery cell in this case moreover represents the smallest dimension of the battery cell, i.e. it is less than the width and length thereof. The angled flanks advantageously also specifically enable directional guidance of the gas stream outgassing from the battery cell in the event of a malfunction. The protection provided by the heat-protection insert can thereby be designed even more efficiently. The flanks of the heat-protection insert, which are angled in the direction of the width of the respective battery cells, prevent such an outgassing gas stream, for example, from impacting the battery cells of an adjacently arranged battery module, particularly an adjacent row, after being reflected from and/or after impacting the heat-protection insert.

In this case, it may be provided that these flanks directly adjoin one another, particularly such that the middle area of the heat-protection insert is formed by a line extending in the longitudinal extension direction. These two flanks then form a V, as seen in the cross-section, wherein the tip of this V is then facing the housing cover. However, these two flanks may also be arranged spaced apart somewhat from one another. Accordingly, the heat-protection insert may also be designed such that the flanks adjoin one another at a central area, which provides the middle area and is expanded in the certain direction and, for example, which extends substantially parallel to the inner side of the housing cover, which is formed, in particular, as a strip extending in the longitudinal extension direction. In other words, the heat-protection insert may have a strip which extends centrally with respect to the width of the respective battery cells in the longitudinal extension direction, with the described angled flanks connecting to said strip on both sides, i.e. in the direction of the width of the battery cells. These embodiments of the heat-protection insert efficiently enable the prevention of the spread of flames and/or of the outgassing gas stream to adjacent battery modules. In addition, various other geometries, in addition to these preferred embodiments, are conceivable for providing the heat-protection insert, which can be suitably selected depending on need, size of the battery module and the battery cells, or the like. Thus, a heat-protection insert ideally adapted to the given requirements can be provided in an especially simple and economical manner.

With a further especially advantageous embodiment of the invention, the flanks of the heat-protection insert are arranged within a housing, which is composed of the heat-protection insert, said housing being open downward, wherein the opening of the housing which is open downward, and particularly also at least one area of the flanks, is arranged above the releasable opening of the at least one battery module in a state of the housing cover in which it is arranged on the housing lower part. In other words, the flanks may be arranged in a housing which is open downward, said housing at least partially enclosing the flanks on the side. This makes it possible to thereby advantageously achieve that a gas stream outgassing from the at least one battery cell during a malfunction is deflected such that it is not reflected back to the relevant battery cell or other battery cells of the battery module after impacting the flanks but is instead captured so to speak within the housing of the heat-protection insert, because the gas stream can be reflected onto the interior of the housing via the flanks. Thus, the escaping gas stream can be specifically guided in its direction such that it cannot directly impact the housing cover, and simultaneously also the battery cell, other battery cells of the same module, or other battery cells of the adjacent module are impacted by this gas stream as little as possible.

In this case, the housing of the heat-protection insert may particularly comprise an upper side, a lower side, and two side parts arranged opposite one another, each of which connects the upper side to the lower side, wherein the upper side is facing the housing cover of the battery housing and the lower side is arranged opposite the upper side and at a distance from the upper side, particularly in the direction of the at least one battery cell, wherein the lower side comprises the opening, which is arranged in a central area of the lower side with respect to the two side parts. The lower side of the housing of the heat-protection insert thus extends from the opening in the direction of the side parts on both sides and is not formed just by the lower-side edges of the side parts. The lower side of the thusly formed housing of the heat-protection insert is thus the side of the heat-protection insert closest to the at least one battery cell, while the flanks arranged in said housing correspondingly are a greater distance away from at least one battery cell. The previously described directional guidance can be implemented in an especially simple and advantageous manner by means of the described geometry and formation of the housing of the heat-protection insert. Thus, an outgassing gas stream initially impacts, for example, one of the two flanks of the heat-protection insert and is deflected by said flank onto an inner wall, which is provided by the lower side of the housing of the heat-protection insert, and from said wall in the direction of an inner wall provided by the upper side of the heat-protection insert. This means that gas streams, particle streams, and flames can be deflected into the interior of the housing of the heat-protection insert via the flanks of the heat-protection insert and thus can be captured in this housing. The damaging extent of such a gas stream can hereby be reduced to a minimum. If a previously described malfunction impacts, for example, only one or a few battery cells of a module, other battery cells can be specifically protected from such overheating by such a deflection of the hot gas stream. A heat-based propagation of such a malfunction can thus be specifically advantageously minimized or completely prevented.

Furthermore, the invention also relates to a motor vehicle with an energy storage device according to the invention or one of its embodiments. The advantages listed for the energy storage device according to the invention and its embodiments thus apply in a similar manner to the motor vehicle according to the invention.

The motor vehicle according to the invention in this case is preferably formed as an electric vehicle or hybrid vehicle. Moreover, the vehicle according to the invention is preferably designed as a motor vehicle, particularly as a passenger car or commercial vehicle, or as a passenger bus or motorcycle.

Furthermore, the invention also relates to a housing cover assembly with a housing cover for a battery housing of an energy storage device according to the invention or one of its embodiments, wherein the housing cover is formed from a first material and has an inner side, which is facing at least one battery module arranged in the battery housing, in a state of the housing cover in which it is arranged on a housing lower part of the battery housing. In this case, the housing cover assembly has at least one heat-protection insert made from a second material, which is different from the first material, which is arranged on the inner side of the housing cover in at least one predetermined first area, which is arranged at least over a releasable opening of the at least one battery cell of the at least one battery module when the housing cover is in a state in which it is placed on the housing lower part.

As previously defined in connection with the energy storage device according to the invention and its embodiments, the releasable opening of the at least one battery cell represents an opening, such as, for example, a pressure relief valve, which is releasable when there is overpressure within the battery cell.

In addition, the definitions, designs, examples, and advantages described, moreover, in connection with the energy storage device according to the invention and its embodiments apply in the same manner as well to the housing cover assembly according to the invention. In particular, the housing cover and the at least one heat-protection insert may be designed and refined as previously described in connection with the energy storage device according to the invention and its embodiments. Thus, the invention also includes refinements of the housing cover assembly according to the invention, which have features as they have already been described in association with the refinements of the energy storage device according to the invention. For this reason, the corresponding refinements of the housing cover assembly according to the invention are not described again herein.

The invention also comprises the combinations of the features of the described embodiments.

BRIEF DESCRIPTION OF DRAWINGS

Exemplary embodiments of the disclosure are described in the following. The following is shown.

DETAILED DESCRIPTION

Figure 1:
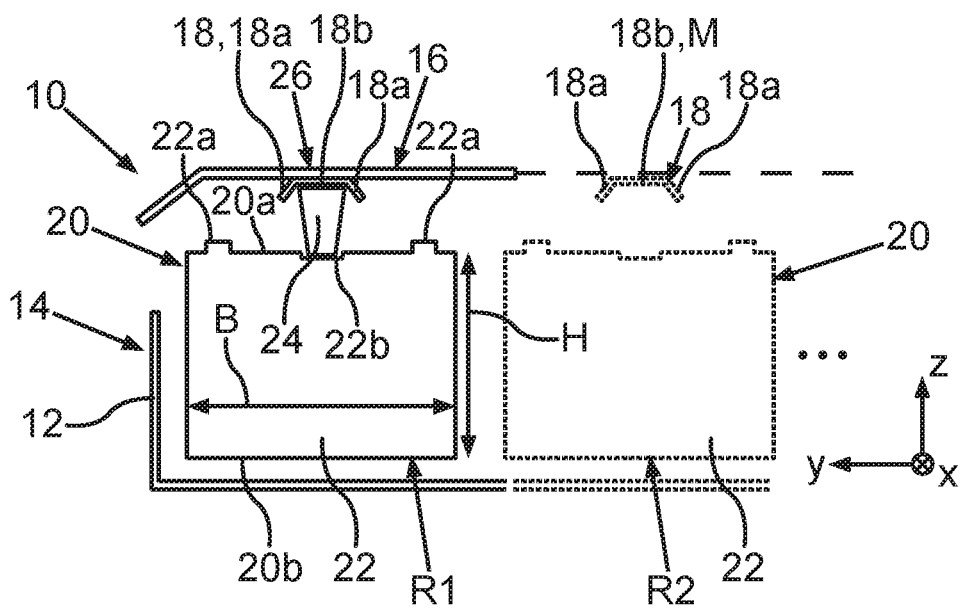
FIG. 1 a schematic representation of a side view of an energy storage device with a battery housing, a housing cover, and a heat-protection insert arranged on the housing cover, according to an exemplary embodiment of the invention.

The exemplary embodiments explained in the following refer to preferred embodiments of the invention. With the exemplary embodiments, the described components of the embodiments represent individual features to be considered independently of one another, which also further embody the invention independently of one another. Thus, the disclosure should also comprise combinations of the features of the embodiments other than those shown. Furthermore, the described embodiments can also be supplemented through further described features of the invention.

The same reference numerals refer to equivalent features and functions in the figures.

FIG. 1 shows a schematic representation of an energy storage device 10 for a motor vehicle, which may be designed particularly as a high-voltage energy storage device, particularly a high-voltage battery, with a battery housing 14, a housing cover 16, as well as a heat-protection insert 18 arranged thereon, according to an exemplary embodiment of the invention. In addition to the housing cover 16, the battery housing 14 also comprises a housing lower part 12, on which the housing cover 16 can be arranged. Furthermore, at least one battery module 20 with at least one battery cell 22 are arranged in the battery housing 14. Preferably, the energy storage device 10 comprises several of such battery modules 20, each having several battery cells 22, as FIG. 1 is intended to illustrate by means of the components in dashed and dotted outline and as shown, for example, in FIG. 2. The individual battery cells 22 of a relevant battery module 20 in this case can be arranged adjacent to one another in a longitudinal extension direction which corresponds to the X direction of the coordinate system shown. The several battery modules 20 may also be arranged, for example, adjacent to one another in this longitudinal extension direction X in a common row R1, R2, R3, wherein several of such rows R1, R2, R3 of these battery modules 20 can be arranged next to one another, i.e. in the Y direction shown here, perpendicular to the longitudinal extension direction X.

Figure 2:
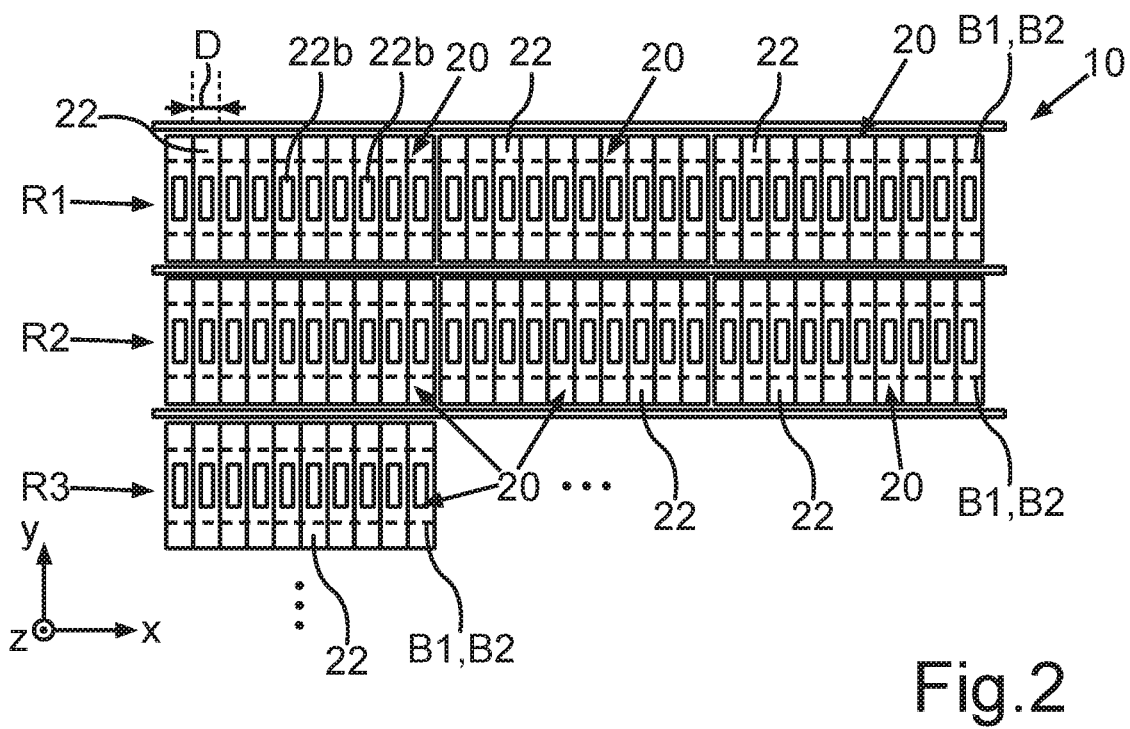
FIG. 2 a schematic representation of a top view of an energy storage device without the housing cover in order to illustrate the positions of the releasable openings of the battery cells of the energy storage device and the corresponding preferred positions of the heat-protection insert, according to an exemplary embodiment of the invention.

The battery cells 22 are preferably prismatic battery cells. They have a height H, a width B, as well as a thickness D (c.f. FIG. 2). The height H of a respective battery cell 22 in this case extends from an upper side 20a of the relevant battery module to a lower side 20b of the relevant battery module, wherein the upper and lower side 20a, 20b of a battery module 20 may also simultaneously represent the upper and lower side 20a, 20b of a relevant battery cell 22. Thus, the height H extends in the Z direction of the coordinate system shown. The width B extends perpendicular to the height H and particularly also perpendicular to the described longitudinal extension direction X, while the thickness D of a respective battery cell 22 extends in the direction of said longitudinal extension direction X. Moreover, the thickness D represents the smallest dimension of the battery cell 22. Furthermore, a respective battery cell 22 has two poles 22a, one positive and one negative, wherein said poles 22a are preferably arranged on the upper side 20a of a respective battery cell 22.

Furthermore, the respective battery cells 22 have an opening 22b which is releasable when there is overpressure within the battery cell 22, for example in the form of a pressure relief valve 22b, on their upper side 20a, particularly preferably in the middle of their upper side 20a, i.e. as relates to their thickness D as well as, and primarily, as relates to their width B. In the event of a malfunction, for example when there is very strong overheating of a relevant battery cell 22 and exceeding of a predetermined critical temperature, very strong gas development can occur within such a battery cell 22. In a case such as this, such a pressure relief valve 22b enables pressure equalization, whereby worse consequences such as, for example, exploding of such a battery cell 22, can be prevented. In the event of such a malfunction, a gas stream 24 can escape which may comprise solid particles and also may be burning and thus is very hot.

With conventional battery housings, such a gas stream, including the abrasive particles contained therein, can impact the housing cover of the battery housing and can cause it to ignite and/or split open, and these particles will then subsequently impact neighboring vehicle parts and may likewise damage them. Accordingly, the very high temperatures developing in the battery housing and primarily also the fire can then quickly propagate into other areas of the motor vehicle. Such a propagation can then advantageously be prevented, or at least greatly inhibited, by the at least one heat-protection insert 18 without having to form the housing cover 16 from a heavier and more heat-resistant and robust material to do this.

Such a heat-protection insert 18 can be specifically locally arranged therein and specifically directly above the respective releasable openings 22b of the battery cells 22, where such a gas stream 24 would impact the housing cover 16 in the event of a malfunction without this heat-protection insert 18. Thus, due to such a heat-protection insert 18, the housing cover 16 and/or the housing cover assembly 26 comprising the housing cover 16 and the at least one heat-protection insert 18 can advantageously be designed locally so as to be more heat-resistant and robust to this abrasive gas stream 24, which enables an increase in fire protection and, in doing so, simultaneously enables the lowest possible total weight of the energy storage device 10, particularly of the housing cover assembly 26.

Preferably, the housing cover 16 is made of aluminum or at least of an aluminum alloy with a very high portion of aluminum. The housing cover 16 can thereby be designed with a very low weight. In contrast, the heat-protection insert 18 is preferably formed from a material that is more heat resistant and more robust than the housing cover 16, for example made of steel, particularly carbide, or a ceramic material or in a sandwich construction comprising several of the aforementioned materials, or the like. At the same time, this heat-protection insert can be designed relatively thin, for example with a thickness, i.e. material thickness, of only 2 to 3 mm. The distance between this heat-protection insert 18 and the battery cell 22 may be, for example, between 30 and 40 mm.

It is also especially advantageous when such a heat-protection insert 18 is assigned to several battery cells 22 of a battery module 20, as well as, optionally, also several battery modules 20 arranged in a same row R1, R2, R3. This simplifies the production of the heat-production insert 18 per se as well as its attachment to the housing cover 16. For example, it may be designed in the form of a strip longitudinally extended in the longitudinal extension direction X and arranged on the housing cover 16 such that the heat-protection insert 18 covers at least the respective releasable openings 22b of the battery cells 20, which are arranged in a same row R1, R2, R3, when the housing cover 16 is properly arranged on the housing lower part 12 of the battery housing 14. This is illustrated, for example, in FIG. 2.

FIG. 2 in this case shows a schematic top view of an energy storage device 10 without the housing cover 16 shown, according to an exemplary embodiment of the invention. As previously mentioned, this example then shows several battery modules 20 each having several battery cells 22, wherein only one battery cell 22 per module 20 is provided with a reference numeral for reasons of clarity. The respective positions of the releasable openings 22b are also shown, of which, likewise, only two have a reference numeral as an example for reasons of clarity.

In addition, one area B1 per row R1, R2, R3 is indicated by dashed lines here, with a respective heat-protection insert 18 preferably being arranged in said area when the housing cover 16 is properly arranged on the housing lower part 12. Such a first area B1 thus corresponds to a second area B2, in which the respective releasable openings 22b of the respective battery cells 22 arranged in a same row R1, R2, R3 are arranged. The first area B1, in which one respective heat-protection insert 18 is arranged per row R1, R2, R3, does not have to be limited to a sub-section of a width B of the relevant battery cells 22, as is illustrated by the dashed lines in FIG. 2, but can also extend, for example, over this second area B2 of the respective releasable openings 22b, in the direction of the width B of the respective battery cells 22, and cover, for example, the total width B of the respective battery cells 22, as is also illustrated, for example, in the example shown in FIG. 3 and explained subsequently in greater detail.

Figure 3:
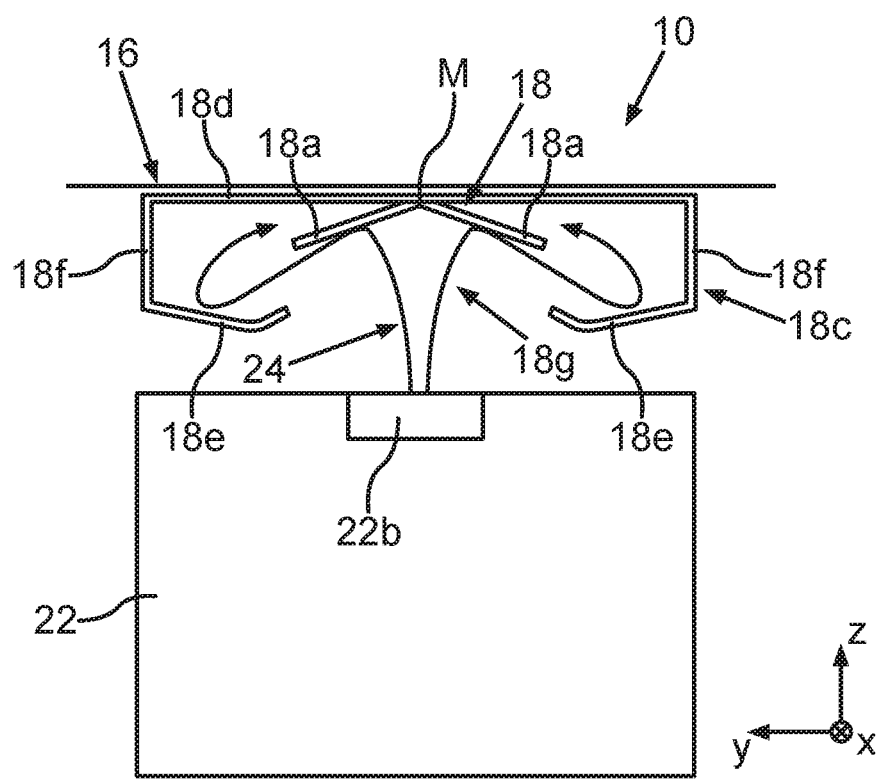
FIG. 3 a schematic representation of a side view of a housing cover assembly with a housing cover and a heat-protection insert arranged thereon relative to a battery cell of an energy storage device, according to a further exemplary embodiment of the invention.

Moreover, the heat-protection insert 18 not only can provide increased robustness and heat resistance in a local area of the housing cover 16, but also, for example, targeted directional guidance of the escaping gas stream 24 in the event of a malfunction. This can thereby be provided, for example, in that the heat-protection insert 18 is formed with two angled flanks 18a, which extend away from a middle area M of the heat-protection insert of the housing cover 16 and away from one another as the distance increases in a certain direction, which is in the direction of the width B of the relevant battery cells 22 in this case. In doing so, these two angled flanks 18a, as shown, for example, in FIG. 1, may be spaced apart from one another in the direction of the width B of the battery cells 22 by means of a central area 18b of the heat-protection insert 18, which then also simultaneously provides said middle area M, or these two flanks can even directly adjoin one another, as shown in FIG. 3, such that the aforementioned middle area M of the heat-protection insert 18 is formed by a line extending in the longitudinal extension direction X. Due to the formation of the heat-protection insert 18 with such flanks 18a, it is advantageously possible to keep the escaping gas stream 24 from spreading to adjacent battery modules 20, particularly such adjacent rows R1, R2, R3. Due to the further advantageous embodiments of the heat-protection insert 18, it can also be designed such that such a gas stream 24 can be prevented, at least to a great extent, from reflecting back onto the battery cell 22, and such a gas stream 24 can be captured so to speak within the heat-protection insert 18, as is illustrated with the example in FIG. 3.

FIG. 3 in this case shows, in turn, a schematic representation of a housing cover assembly 26 with a housing cover 16 and a heat-protection insert 18 as relates to a battery cell 22 according to a further exemplary embodiment of the invention. The heat-protection insert 18 in this case may be designed as previously described and additionally comprise a housing 18c. The two angled flanks 18a of the heat-protection insert 18 are then correspondingly arranged within said housing 18c. The gas stream 24 escaping from the releasable opening 22b in the event of a malfunction and the directional deflection thereof are shown schematically by these two arrows in FIG. 3. As can be seen, this escaping gas stream 24 can be specifically deflected by means of this advantageous geometry of the heat-protection insert 18 to the extent that said gas stream is captured so to speak within the heat-protection insert 18 and hardly any of said gas stream 24 can be reflected back onto the battery cell 22 or adjacent battery cells 22. In order to enable this, this housing 18c of the heat-protection insert 18 may be formed, for example, with an upper side 18d arranged on the housing cover 16, with a lower side 18e opposite said upper side 18d, and two side walls 18f, each of which connects the upper side 18d to the lower side 18e. Furthermore, an opening 18g, which enables the escaping gas stream 24 to penetrate the interior of the housing 18c of the heat-protection insert 18, is arranged on the lower side 18e. The two angled flanks 18a of the heat-protection insert 18 are then arranged directly above this opening 18g in the Z direction shown.

Thus, the heat-protection insert 18 not only can prevent burning and/or splitting open of the housing cover 18 in an especially advantageous manner in the event of an outgassing battery cell 22, but said insert also provides specific directional guidance of such a gas stream 24, by means of which the extent of the damage and particularly also the spread to other battery cells 22 and battery modules 20 can be limited or even prevented.

As a whole, the examples show how the invention can provide component protection of components situated outside of a high-voltage battery upon outgassing of at least one battery cell of the high-voltage battery in the event of a malfunction in that at least one heat-protection insert is arranged on the housing cover in an especially weight-reducing manner. Such a heat-protection insert can be provided, for example, by means of targeted placement of carbide strips and/or strips made of ceramic materials on or in the housing cover, which may be an aluminum cover, and said insert can thereby prevent the housing cover from being burned through as well as provide a deflection of the gas stream by means of the bending of said sheets and/or metal strips and/or ceramic components.

The invention claimed is:

1. An energy storage device for a motor vehicle comprising:
   at least one battery module with at least one battery cell, wherein the at least one battery module has a lower side and an upper side opposite the lower side, the at least one battery cell has an opening, which is releasable when there is overpressure in the at least one battery cell, on the upper side of the at least one battery module;
   a battery housing with a housing lower part, which comprises a housing base, wherein the at least one battery module is arranged in the battery housing with the lower side facing the housing base, the battery housing has a housing cover made of a first material, facing the housing lower part, and the housing cover has an inner side facing the at least one battery module when the housing cover is placed on the housing lower part; and
   at least one heat-protection insert made of a second material, which is different from the first material, arranged on the inner side of the housing cover in at least one predetermined first area and at least over the releasable opening of the at least one battery cell when the housing cover is placed on the housing lower part, wherein the at least one heat-protection insert has two angled flanks which extend away from the housing cover and away from one another as a distance increases, in a certain direction, from a middle area of the at least one heat-protection insert, the certain direction extends in a direction of a width of the at least one battery cell when the housing cover is placed on the housing lower part, the width of the at least one battery cell extends perpendicular to a height of the at least one battery cell, which extends, in turn, in a direction from the upper side to the lower side of the at least one battery module.

2. The energy storage device according to claim 1, wherein the second material is more heat-resistant than the first material, the first material comprises aluminum, and the second material comprises iron or a ceramic material.

3. The energy storage device according to claim 1, wherein the at least one battery module has a cell pack with several battery cells, which are arranged next to one another in a longitudinal extension direction, comprising the at least one battery cell, each of the several battery cells has a releasable opening on the upper side of the at least one battery module, the releasable openings of the several battery cells are arranged along a second area extending in the longitudinal extension direction, the at least one heat-protection insert is placed on the inner side of the housing cover above the second area and covers the entire second area when the housing cover is placed on the housing lower part.

4. The energy storage device according to claim 1, wherein the energy storage device has several battery modules arranged in a same row in a longitudinal extension direction, the releasable openings of the respective battery cells of the several battery modules arranged in the same row are all arranged along the second area which extends in the longitudinal extension direction.

5. The energy storage device according to claim 1, wherein the two angled flanks directly adjoin one another such that the middle area of the at least one heat-protection insert is formed by a line extending in a longitudinal extension direction, or the two angled flanks adjoin at a central area, which provides the middle area and is expanded in the certain direction, said middle area being formed as a strip extending in the longitudinal extension direction.

6. The energy storage device according to claim 1, wherein the two angled flanks of the at least one heat-protection insert are arranged within a housing, which is composed of the at least one heat-protection insert, an opening of the housing is open downward, and at least one area of the two angled flanks is arranged above the releasable opening of the at least one battery module when the housing cover is placed on the housing lower part.

7. The energy storage device according to claim 1, wherein the at least one heat-protection insert comprises an upper side, a lower side, and two side parts arranged opposite one another, each of which connects the upper side to the lower side, the upper side is facing the housing cover of the battery housing, the lower side is arranged opposite the upper side and at a distance from the upper side, and the lower side comprises the releasable opening, which is arranged in a central area of the lower side with respect to the two side parts.

8. The energy storage device according to claim 2, wherein the at least one battery module has a cell pack with several battery cells which are arranged next to one another in a longitudinal extension direction, comprising the at least one battery cell, wherein each of the several battery cells has a releasable opening on the upper side of the at least one battery module, wherein the releasable openings of the several battery cells are arranged along a second area extending in the longitudinal extension direction, the at least one heat-protection insert is placed on the inner side of the housing cover above the second area and covers the entire second area when the housing cover is placed on the housing lower part.

9. The energy storage device according to claim 2, wherein the energy storage device has several battery modules arranged in a same row in the longitudinal extension direction, the releasable openings of the respective battery cells of the several battery modules arranged in the same row are all arranged along the second area which extends in the longitudinal extension direction.

10. The energy storage device according to claim 3, wherein the energy storage device has several battery modules arranged in a same row in the longitudinal extension direction, the releasable openings of the respective battery cells of the several battery modules arranged in the same row are all arranged along the second area which extends in the longitudinal extension direction.

11. The energy storage device according to claim 2, wherein the two angled flanks directly adjoin one another such that the middle area of the at least one heat-protection insert is formed by a line extending in the longitudinal extension direction, or the two angled flanks adjoin at a central area, which provides the middle area and is expanded in the certain direction, said middle area being formed as a strip extending in the longitudinal extension direction.

12. The energy storage device according to claim 3, wherein the two angled flanks directly adjoin one another such that the middle area of the at least one heat-protection insert is formed by a line extending in the longitudinal extension direction, or the two angled flanks adjoin at a central area, which provides the middle area and is expanded in the certain direction, said middle area being formed as a strip extending in the longitudinal extension direction.

13. The energy storage device according to claim 4, wherein the two angled flanks directly adjoin one another, such that the middle area of the heat-protection insert is formed by a line extending in the longitudinal extension direction, or the flanks adjoin at a central area, which provides the middle area and is expanded in the certain direction, said middle area being formed as a strip extending in the longitudinal extension direction.

14. The energy storage device according to claim 2, wherein the two angled flanks of the heat-protection insert are arranged within a housing, which is composed of the heat-protection insert, said housing being open downward, wherein the opening of the housing, which is open downward, and at least one area of the two angled flanks, is arranged above the releasable opening of the at least one battery module in a state of the housing cover in which it is arranged on the housing lower part.

15. A housing cover assembly comprising:
- a housing cover for a battery housing, wherein the housing cover is formed from a first material and has an inner side, which is facing at least one battery module arranged in the battery housing when the housing cover is placed on a housing lower part of the battery housing; and
- at least one heat-protection insert made from a second material, which is different from the first material, arranged on the inner side of the housing cover in at least one predetermined first area at least over a releasable opening of at least one battery cell of the at least one battery module when the housing cover is placed on the housing lower part, wherein the at least one heat-protection insert has two angled flanks which extend away from the housing cover and away from one another as a distance increases, in a certain direction, from a middle area of the at least one heat-protection insert, the certain direction extends in a direction of a width of the at least one battery cell when the housing cover is placed on the housing lower part, the width of the at least one battery cell extends perpendicular to a height of the at least one battery cell, which extends, in turn, in a direction from the upper side to the lower side of the at least one battery module.

\* \* \* \* \*